(12) United States Patent
Denoual et al.

(10) Patent No.: US 8,239,578 B2
(45) Date of Patent: Aug. 7, 2012

(54) METHOD AND DEVICE FOR TRANSFERRING DIGITAL DATA WITH A PROGRESSIVE FORMAT

(75) Inventors: Franck Denoual, Saint Domineuc (FR); Jeanne Guillou, Plougastel Daoulas (FR)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 11/813,261

(22) PCT Filed: Feb. 3, 2006

(86) PCT No.: PCT/IB2006/000549
§ 371 (c)(1),
(2), (4) Date: Jul. 20, 2007

(87) PCT Pub. No.: WO2006/085221
PCT Pub. Date: Aug. 17, 2006

(65) Prior Publication Data
US 2008/0109532 A1    May 8, 2008

(30) Foreign Application Priority Data
Feb. 11, 2005 (FR) .................................... 05 01402

(51) Int. Cl.
*G06F 15/16* (2006.01)
*H04N 7/01* (2006.01)
(52) U.S. Cl. ........ 709/247; 709/219; 709/231; 709/232; 348/441; 348/458; 348/459
(58) Field of Classification Search .................. 709/219, 709/231, 232, 247; 348/441, 458, 459
See application file for complete search history.

(56) References Cited

U.S. PATENT DOCUMENTS

| 6,684,088 B1 | 1/2004 | Halahmi .................. 455/566 |
| 7,385,921 B2 * | 6/2008 | Itakura et al. .............. 370/230 |
| 2003/0055907 A1 | 3/2003 | Stiers .......................... 709/206 |
| 2003/0110167 A1 * | 6/2003 | Kim .................................. 707/4 |
| 2003/0118107 A1 * | 6/2003 | Itakura et al. ............. 375/240.19 |
| 2004/0267687 A1 | 12/2004 | Aschen et al. ................ 707/1 |

(Continued)

OTHER PUBLICATIONS

Sanchez et al., IEE Transactions on Circuits and Systems for Video Technology, Prioritized Region of Interest Coding in JPEG2000, Sep. 2004, IEEE, vol. 14, No. 9, 1149-1150.*

(Continued)

*Primary Examiner* — Haresh N Patel
*Assistant Examiner* — Peter Shaw
(74) *Attorney, Agent, or Firm* — Fitzpatrick, Cella, Harper & Scinto (57) ABSTRACT

Method of transferring digital data between a client device and a server device on a communication network, said method being implemented within said server device and comprising: i) coming from the client device, receiving a request in markup format for the delivery of a digital object or part of a chosen digital object, ii) obtaining in the communication network a representation of the object requested, iii) checking whether the representation of the object thus obtained corresponds to a data compression format of the progressive type, iv) in the event of a positive check, dividing the digital object into a plurality of sub-parts, to each sub-part there being allocated a high priority rank defined according to at least one chosen criterion, and v) sending to the client device a response in markup format comprising the sub-parts of the digital object in binary format and associated priority ranks in markup format.

34 Claims, 5 Drawing Sheets

U.S. PATENT DOCUMENTS

2005/0074172 A1* 4/2005 Kodama ............ 382/232
2005/0231752 A1* 10/2005 Sainio ............ 358/1.15
2005/0271283 A1* 12/2005 Dekel et al. .......... 382/232
2006/0123047 A1* 6/2006 Christensen et al. ..... 707/103 R

OTHER PUBLICATIONS

Aug. 23, 2007 International Preliminary Report on Patentability in PCT/IB2006/000549.

Moe, et al., "Adapting Email Functionality for Mobile Terminals", INTELLCOM 2004, LNCS 3283, Lecture Notes in Computer Science, Nov. 23, 2004, pp. 199-206.

Salz, "Transporting Binary Data in Soap", XML.COM, Aug. 28, 2002, pp. 1-4.

Powell, "DIME: Sending Binary Data with Your Soap Messages", Microsoft MSDN Library, Jan. 22, 2002, pp. 1-7.

Jun. 9, 2006 International Search Report and Written Opinion in PCT/IB2006/000549.

* cited by examiner

METHOD AND DEVICE FOR TRANSFERRING DIGITAL DATA WITH A PROGRESSIVE FORMAT

The present invention relates to the transfer of digital data, with a progressive or scalable format, between a client device and a server device through a communication network.

It finds a particular application in the supply of digital data and more particularly digital images having a progressive or scalable format.

In general terms, within a communication network, certain server computers offer services to other computers, referred to as clients, in the communication network. Previously these services were accessible via proprietary protocols, such as CORBA ("Common Object Request Broker Architecture"), DCOM ("Distributed Component Object Model"), or JINI ("Java Image I/O").

At the present time, these services are becoming more and more accessible by means of non-proprietary or standard communication protocols, such as SOAP.

The SOAP protocol ("Simple Object Access Protocol") is an application of the XML ("Extensible Markup Language") markup language. It enables two computers to exchange information in the form of blocks. In general terms, a SOAP message consists of an envelope containing header blocks and body blocks. In addition, since the SOAP language does not provide a communication protocol proper, a SOAP message, that is to say a SOAP envelope, is effectively transmitted from one computer to another by a communication protocol, such as the hypertext transfer protocol known as HTTP ("HyperText Transfer Protocol"), or by a protocol used for electronic mail exchange such as SMTP ("Simple Mail Transfer Protocol"), or by a file transfer protocol of the FTP ("File Transfer Protocol") type. The layer which makes it possible to interface the SOAP protocol with these communication protocols is referred to as a "binding". The tool for processing the SOAP messages is hereinafter referred to as the SOAP processor.

In practice, including binary data in XML data requires prior encoding of the binary data to the base 64 format. However, encoding to the base 64 format involves an increase of one third in the volume of data. The SwA ("SOAP Messages with Attachments") and MTOM ("Message Transmission Optimization Mechanism") protocols define, respectively for the SOAP language versions 1.1 and 1.2, a means of attaching the raw binary data to the message, that is to say without base 64 encoding. This therefore optimizes the messages in terms of bandwidth, but also in terms of calculation time on transmission and reception of the messages, since base 64 coding and base 64 decoding are no longer necessary.

In practice, the SwA and MTOM protocols are both based on the MIME Multipart ("Multipurpose Internet Mail Extensions") format, which is a communication protocol which makes it possible to include other things than text (image, for example) in the electronic mail. In particular, SwA describes a way of writing a SOAP 1.1 message in part of a MIME Multipart message and a way of referencing the other MIME parts of the message in the SOAP message. The MTOM protocol describes a serialization of SOAP 1.2 messages to the MIME Multipart format.

A SOAP service is in general described by a WSDL ("Web Service Description Language") document. WSDL is a service description language especially adapted to the description of SOAP or HTTP services.

The XOP ("XML-binary Optimized Packaging") language is also known, which is an application of the XML language. This specification provides a method of serializing XML messages in an extensible packaging format (that is to say a format in which it is possible to delimit parts). It describes in particular XML serialization to the MIME Multipart/related format. The XML message is then the root MIME part of the message and the contribution of XOP consists of replacing the binary data encoded conventionally in a base 64 XML message by means of a reference on a MIME part. This makes it possible to avoid the redundancy and processing time introduced by the base 64 representation of the binary data. The tool for analyzing the MIME format is hereinafter referred to as the MIME analyzer.

Moreover, the concept of scalability (or progressiveness) is related to the concept of compression of multimedia data. In order to address several client devices with the same compressed file, it is necessary to have available audio data, images and/or video in a progressive format composed of a basic version on one of more refinement versions. In addition, such scaleable formats also enable a server device to transmit the data progressively ("streaming") to one or more client devices. It is possible to cite as example of a scaleable format, in the context of the compression of images, the JPEG200 standard (the acronym for "Joint Photographic Expert Group"), with its Internet JPIP transmission protocol ("JPEG 2000 Internet Protocol") which, in the context of a client/server application, consists of exchanging JPEG2000 data. Such a JPIP protocol makes it possible to transmit solely the necessary encoded data corresponding to a request from a client device, For example, the data corresponding to a given area of the image or the data for the low resolution of the image are only transmitted after encoding.

In practice, the MTOM mechanism described above makes it possible to attach binary data, of the image, audio or video type, to data of the text type, such as XML messages, within a SOAP envelope. This means that a server responding to a client request on an image or a video can send a message whose size depends on the size of the image or video requested.

The message can therefore be of large size and its processing may prove to be detrimental in the case of client devices having a small bandwidth for communicating with the server device or client devices not having memory, calculation and/or display capacities sufficient to process all the message thus formed. This uncertainty may, initially, prove to be detrimental from the point of view of quality of service for the user, who must await the end of the reception and processing of the message in order to display the message or video contained in the message. A more detrimental consequence is for example the saturation of the memory of the client apparatus, which may give rise to errors in the processing of the message and possibly compromise the stability of the application, or even of the processing system.

A first solution to this problem is proposed in the patent application US 2003/0055907 A1 entitled "Clientless electronic mail MIME attachment re-delivery system via the web to reduce network bandwidth usage". This solution avoids the saturation of the network in an electronic messaging system by processing the mails containing the attachments. The solution consists of replacing each attachment with a reference on which the client application can make a request if it wishes to recover the corresponding attachment.

However, this solution proves to be relatively blunt edged since it is a case of an "all or nothing" system, in which each attachment is either transmitted in its entirety or entirely removed from the message. In addition, it requires a new, or even several, request(s) from the client in order to recover any attachments replaced by links.

A second solution is proposed in the U.S. Pat. No. 6,684, 088, entitled "System and method for displaying electronic mail messages on a low bandwidth device" Both the body of the message (an electronic mail) and any attachments are here adapted by the server device according to characteristics of mobile client devices communicating with the same server via the WAP protocol ("Wireless Application Protocol"). The adaptation of the message to a given client appliance falls to the server device and thus leads to the transmission of an adapted message formatted according to the characteristics of the client device. The choice is then left to the client to request more information on the contents of the electronic message. This system applies solely to electronic messaging services and to their dedicated protocols such as IMAP4 ("Internet Message Access Protocol version 4") or POP3 ("Post Office Protocol 3"). On the other hand, it does not apply to web services in general based on the SOAP protocol.

The Applicant set itself the problem of providing a transfer of digital data with a progressive or scalable format not having the drawbacks of the transfers of the state of the art.

The present invention affords precisely a solution to this problem.

It relates to a method of transferring digital data between a client device and server device on a communication network, said method being implemented within said server device.

According to a general definition of the invention, the method comprises the following steps:

i) coming from the client device, receiving a request, written in markup format, for the delivery of a digital object or part of a chosen digital object, ii) obtaining in the communication network a representation of the object requested, iii) checking whether the representation of the object thus obtained corresponds to a data compression format of the progressive type, iv) in the event of a positive check, dividing the digital object into a plurality of sub-parts, to each sub-part there being allocated a high priority rank defined according to at least one chosen criterion, and v) sending to the client device a response in markup format comprising said sub-parts of the object in binary format and the associated priority ranks in markup format.

Thus the method according to the invention is a transmission of binary data in messages with a progressive or scalable format, which leaves the application the possibility of processing one or more sub-parts of the message in order firstly to have available more quickly at least part of the pieces considered to be relatively important according to chosen criteria and secondly to leave a way out in the case of error during the reading of the message.

According to one embodiment, the parameters of the request coming from the client device are defined by markup structures of the XML type or the like exchanged between the client device and the server device by a transport protocol of the SOAP type or the like.

According to another embodiment, the sending of the response to the client device takes place by sending a message comprising markup structures of the XML type or the like and binary data, the corresponding message being formatted according to a specific markup format of the XOP type or the like. For example, the sending of the message is effected by a transport protocol of the SOAP type or the like, the message being serialized according to the MTOM protocol or the like.

According to another embodiment, the binary data of each sub-part of the object are included in a MIME part or the like.

For example, the priority criteria is defined according to at least one item of information relating to the digital object or to the transfer thereof and belonging to a group formed by the transfer rate, the resolution of the object and the quality of the object.

In practice, the priority rank is expressed in the form of a chain of numeric, alphanumeric or Boolean operator criteria.

In practice, the priority rank is inserted in the response from the server device in the form of an attribute in the markup language. In the case of a rank of high priority, the insertion in the form of an attribute in the response of the server device is optional.

In practice, the client request comprises the URI of the object requested.

According to one embodiment, the predetermined data compression format of the progressive type is the JPEG2000 type format.

Another object of the present invention is a method of transferring digital data between a client device and a server device over a communication network, said method being implemented within said client device, said method comprising the following steps:

1) coming from the server device and, in response to a request to supply a digital object or part of a chosen digital object addressed to said server device, receiving a response in markup format comprising priority ranks in markup format allocated to sub-parts of the object and the said sub-parts of the object in binary format;

2) processing the sub-parts received in decreasing order of their priority rank;

3) at each sub-part thus processed, verifying a processing capacity condition;

4) in the case of positive verification, processing the binary data of the sub-part of the object with the lower priority rank; and 5) in the case of negative verification, not taking account of the current sub-part, as well as the sub-parts with the lower priority rank.

Another object of the present invention is a server device for the transfer of digital data with a client device on a communication network.

According to another aspect of the invention, the device comprises:
  reception means able, coming from the client device, to receive a request in mark-up format to deliver a digital object or part of a chosen digital object,
  means for obtaining in the communication network a representation of the object requested,
  verification means in order to verify whether the representation of the object thus obtained corresponds to a data compression format of the progressive type,
  processing means for, in the case of positive verification, dividing the object into a plurality of sub-parts, to each sub-part there being allocated a priority rank defined according to at least one chosen criterion, and
  communication means for sending, to the client device, a response in mark-up format comprising the sub-parts of the object in binary format and the associated priority ranks in mark-up format.

Another object of the present invention is a client device for the transfer of digital data with a server device on a communication network, said client device comprising:
  reception means able to receive, coming from the server device and, in response to a request to deliver a digital object or part of a chosen digital object addressed to said server device, a response in mark-up format comprising priority ranks in mark-up format allocated to sub-parts of the object and said sub-parts of the object in binary format; and processing means able to process the sub-parts received in decreasing order of their priority rank, to verify a processing capacity condition at each sub-part thus processed, to process the binary data of the sub-part of the object of lower priority rank in the case of positive verification and not take account of the current sub-part as well as the sub-parts with lower priority rank in the case of negative verification.

Another object of the present invention is a device for transferring digital data between a client device and a server device on a communication network, in which the server device and/or the client device is adapted for implementing the method mentioned above.

Another object of the present invention is an information medium which can be read by a computer system, characterized in that it contains instructions on a computer program for implementing the transfer method mentioned above.

Another object of the present invention is an information medium which is removable, partially or totally, and can be read by a computer system, characterized in that it contains instructions of a computer program implementing a transfer method mentioned above, when this program is loaded into and executed by a computer system.

Finally, an object of the present invention is a computer program stored on an information medium, said program containing instructions for implementing a transfer method when this program is loaded into and executed by a computer system.

Other characteristics and advantages of the invention will emerge in the light of the following detailed description and the drawings, in which.

Figure 1:
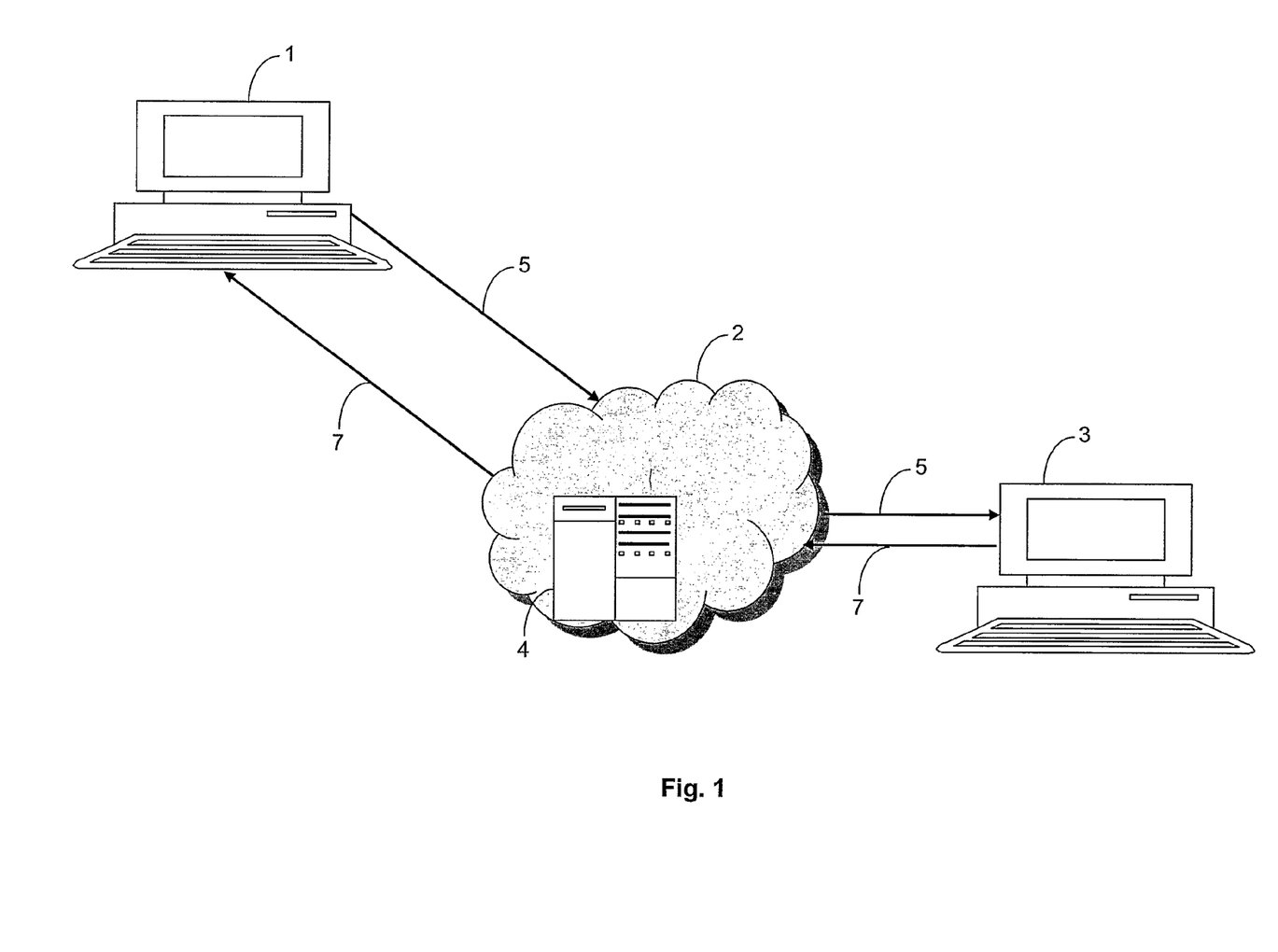
FIG. 1 depicts schematically a communication network in which the method according to the invention is implemented.

With reference to FIG. 1, a description has been given of an example of a context applying the invention using a server device 1, processing the data according to the MTOM protocol, a communication network 2 having zero or several intermediate nodes 4 and one or more client devices 3 processing the data according to the MTOM protocol. Provision is made for an exchange, according to the MTOM protocol, between the server device 1 and the client devices 3, of messages 5 containing binary data (audio, video, images, etc). These messages 5 may possibly pass through the intermediate nodes 4 situated in the network 2. The intermediate nodes 4 merely monitor the messages 5 coming from the server device 1 as far as client devices 3 and the request 7 from the client devices 3 to the server device 1.

One example of use is as follows: the server device 1 has an image database and a web service processing image requests 7 and responding by returning the requested image, the whole via messages 5, written in SOAP language and formatted in MIME format. The invention relates essentially to the way in which the response from the server device is constructed and on the way it is processed by the client device. This construction enables the client device to have part of the image available more rapidly and indicates to it the most important parts thereof (having a high priority rank for example). The request from the client device corresponding to the image request is a message written in conventional SOAP language.

Figure 2:
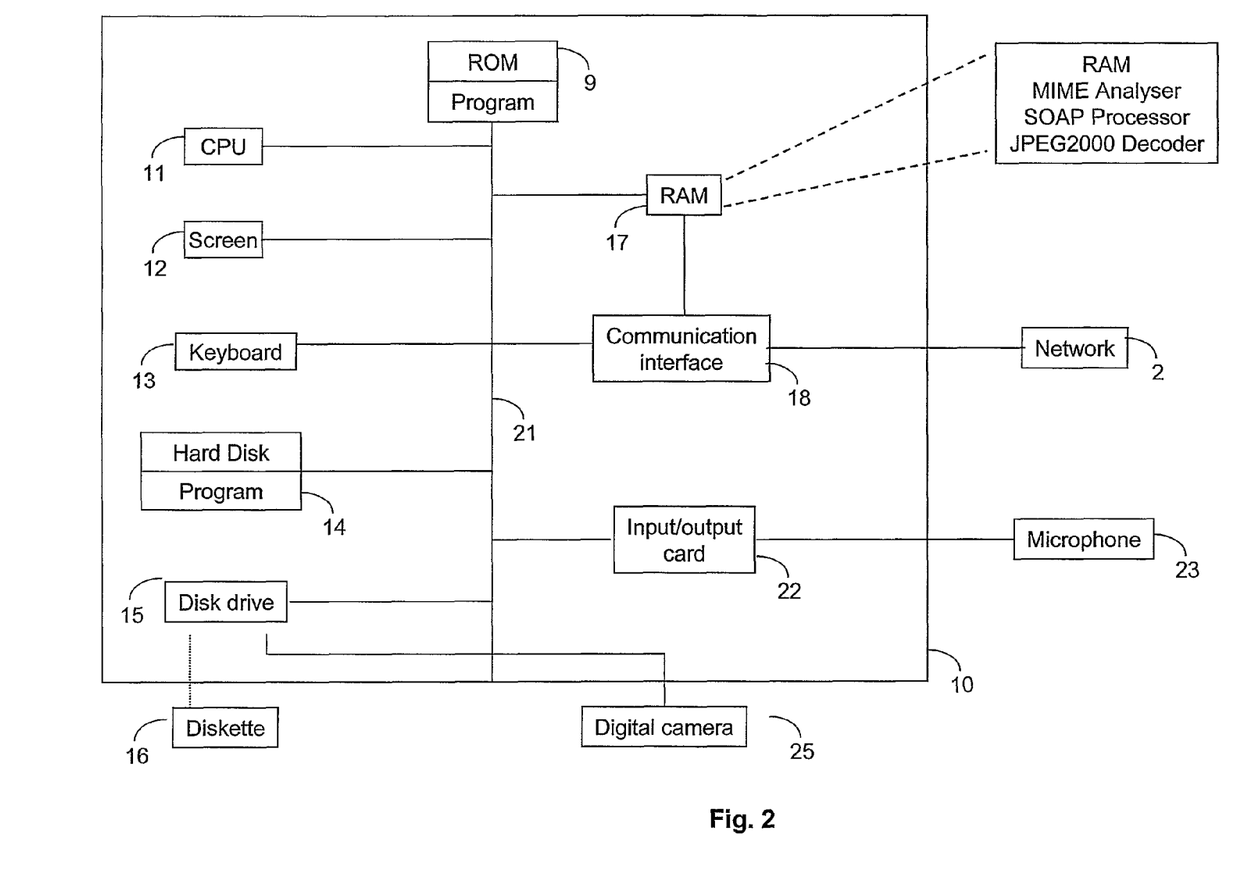
FIG. 2 depicts schematically a computer in which the software according to the invention can be executed.

With reference to FIG. 2, a device 10 is shown, such as a microcomputer and its various peripherals, in which the invention can be implemented.

The device 10 comprises, for example, a digital camera 25 (or a scanner or any other image acquisition or storage means) connected to a graphics card and supplying information to be compressed according to the invention.

The device 10 comprises a communication interface 18 connected to the communication network able to transmit digital data to be compressed or to transmit data compressed by the device 10. The device 10 also comprises a storage means 14, such as for example a hard disk, as well as a disk drive 50. The diskette 24 may contain compressed data according to the invention as well as the code of the invention which, once read by the device 10, is stored on the hard disk 14.

According to a variant, the software program enabling the device to implement the invention can be stored in read only memory 9 (referred to as ROM).

According to another variant, the program can be received in order to be stored in an identical fashion to that described previously by means of the communication network 2.

The device 10 is connected to a microphone 23, by means of the input/output card 22. The data to be transmitted (in the case of the server device) according to the invention are, in this case, of the audio signal. A screen 12 displays the data to be compressed (in the case of the client device), by means of the keyboard 13 or any other means (a mouse for example). The central unit 11 (referred to as CPU) executes the instructions relating to the implementation of the invention, instructions stored in the read only memory 9 or in the other storage elements. On powering up, the program managing the SOAP resources (SOAP processor) and the decompression program stored in a non-volatile memory, for example the ROM 9, are transferred into the random access memory RAM 17 which then contains the executable code of the invention, as well as registers for storing the variables necessary for implementing the invention. Naturally the diskettes can be replaced by any information medium such as a CD-ROM or memory card. In more general terms, an information storage means, which can be read by a computer or by a microprocessor, integrated or not into the device, possibly removable, stores the program implementing the execution method. The communication bus 21 affords communication between the various elements included in the microcomputer 10 or connected to it. The representation of the bus is not limiting and in particular the central unit 11 is able to communicate instructions to any element of the microcomputer 10 directly or by means of another element of the microcomputer 10.

Figure 3:
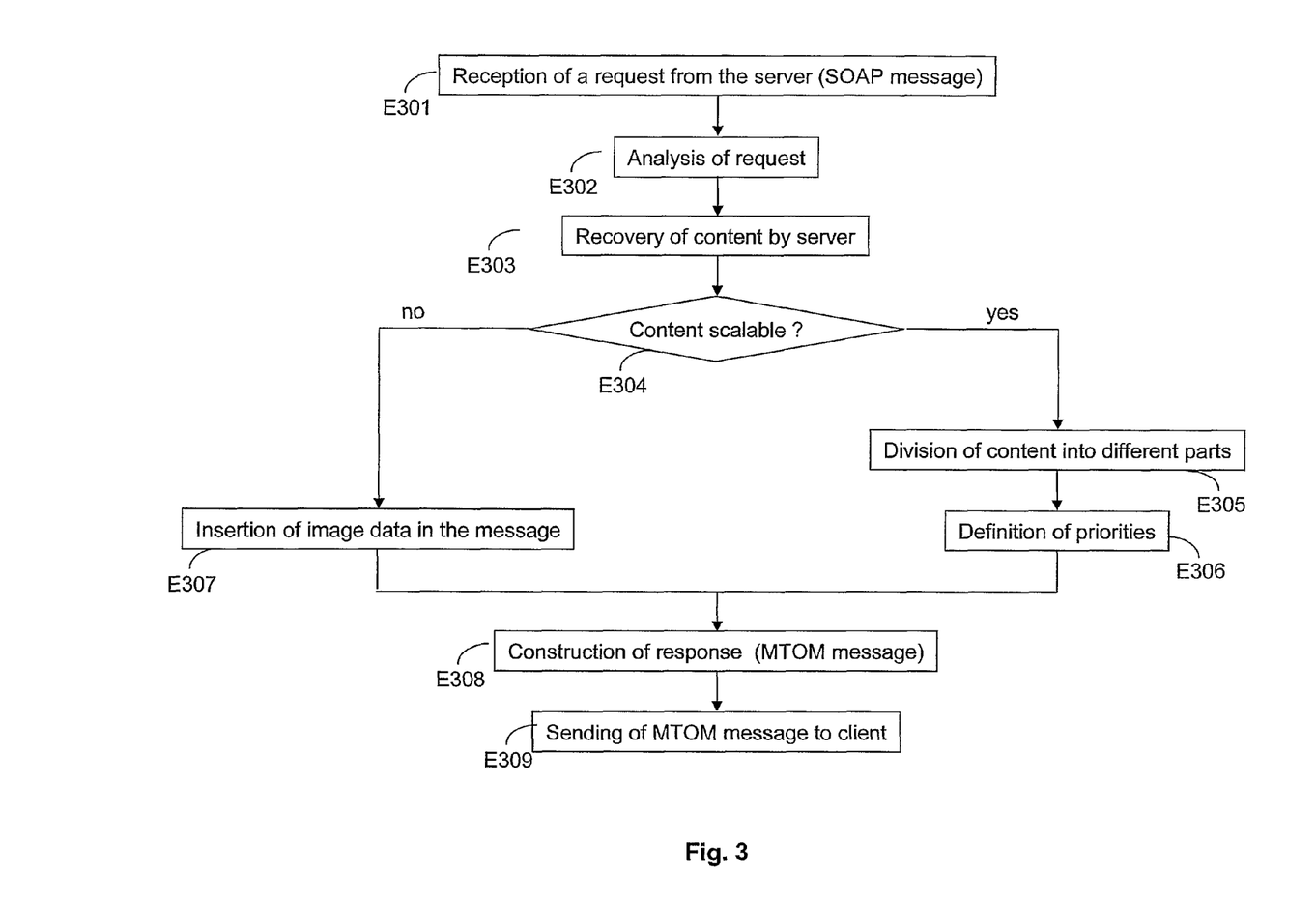
FIG. 3 is a flow diagram illustrating the steps of the method according to the invention on the server device side.

With reference to FIG. 3, the implementation of the invention on the server device side has been depicted.

First of all, during step E301, the server device receives the request 7 from the client device. This request 7 consists of a SOAP message containing an identifier of the image that the client device wishes to recover. During step E302, the server device extracts this identifier (URI for example) from the SOAP message by virtue of a SOAP processor and, during step E303, recovers the associated content (in the embodiment depicted here, an image). During step E304, the server device checks whether the format of the image is a progressive (scalable) encoding format. If such is the case, during step E305, the server device implements an operation which consists of dividing the content of the digital object into various sub-parts, connected to one or other in a chosen hierarchical relationship. This division may be based on a rate criterion from the transmission of the image, on an image resolution criterion if the server device knows the display capacities of the client device, or on an image quality criterion.

For example, according to one embodiment, an image is considered in a progressive data compression format of the JPEG2000 type encoded on R resolution levels and Q quality levels. A division consists of limiting the number of the various parts and sub-parts to N,∀N ∈[1,max(R,Q)] and thus defining the following relationships:

| Index of the part | Resolution level | Quality level | Priority level |
|---|---|---|---|
| 1 | Integer part of 1 * R/N | Integer part of 1 * Q/N | Pmax |
| 2 | Integer part of 2 * R/N | Integer part of 2 * Q/N | Pmax. (1 − 2/N) |
| ... | ... | ... | ... |
| I | I | Integer part of i * Q/N | Pmax. (1 − i/N) |
| ... | ... | ... | ... |
| N | R | Q | 0 |

For the effective division of the data, the server device has a JPEG2000 decoder (or more exactly an analyzer, since there is no complete decoding of the images but only a selection of data), which recovers the data, or the increment of binary data associated respectively with a given resolution level and quality level, or with the increment in resolution and/or quality from one sub-part to another. Each sub-part is inserted during this same step in its own MIME part, as illustrated in example 1 mentioned below.

Once the division is made, the server assigns priority ranks, during step E306, to each of the sub-parts obtained. An example of priority rank calculation is given in the table above. The priority rank of each sub-part is kept in the memory of the server device and is used when the response is formed at step E308.

During the response formation step E308, the server device can indicate the priority rank of the various sub-parts in binary format transmitted as attachments to the client device, so that it can decide on their processing or not. This is carried out during the writing of the MTOM message by the SOAP processor: an optional attribute is added to the element "xop:include", which indicates the presence of an attachment. The value of this attribute corresponds to the priority rank value calculated during step E306 and as illustrated in the above table. Example 1 above illustrates such a response using the MTOM mechanism described previously. In bold there appear the differences compared with the state of the art (sending of the image in a single part to the MIME format, as illustrated in example 2 mentioned below).

It should be noted that the priority mechanism described here is not limiting and may for example be a Boolean attribute system, indicating simply whether the sub-part is optional or obligatory, or mentioning only the optional parts or any other means of introducing information of importance or priority rank with regard to each sub-part.

In addition, if necessary, the server device can proceed with the sequencing of the sub-parts according to their priority rank during step E308.

```
MIME-Version: 1.0
Content-Type: Multipart/Related;boundary=MIME_boundary;
    type="application/xop+xml";
    start="<mymessage.xml@example.org>"
    start-info="" "application/soap+xml"
Content-Description: An XML document with my picture in it
--MIME_boundary
Content-Type: application/xop+xml;
        charset=UTF-8;
        type="text/xml"
Content-Transfer-Encoding: 8bit
Content-ID: mymessage.xml@example.org
<soap:Envelope
    xmlns:soap='http://www.w3.org/2003/05/soap.envelope'
    xmlns:xop='http://www.w3.org/2003/12/xop/include'
    xmlns:xmlmime='http://www.w3.org/2004/06/xmlmime'>
    <soap:Body>
        <m:data xmlns:m='http://example.org/stuff'>
            <m:photo xmlmime:content-type='image/jp2'>
                <xop:Include href='cid:http://example.org/
myphoto_basic.jp2' priority = mandatory/>
                <xop:Include href='cid:http://example.org/
myphoto_enh1.jp2' priority = medium/>
                <xop:Include href='cid:http://example.org/
myphoto_enh2.jp2' priority = low/>
            </m:photo>
        </m:data>
    </soap:Body>
</soap:Envelope>
--MIME_boundary
Content-Type: image/jp2
Content-Transfer-Encoding: binary
Content-Length : 27841
Content-ID: http://example.org/myphoto_basic.jp2
// binary octets for the first required part of the image
--MIME boundary
Content-Type: image/jp2
Content-Transfer-Encoding: binary
Content-Length : 127893
Content-ID: http://example.org/myphoto_enh1.jp2
// binary octets for the second optional part of the image
--MIME boundary
Content-Type: image/jp2
Content-Transfer-Encoding: binary
Content-Length : 157896
Content-ID: http://example.org/myphoto_enh2.jp2
// binary octets for the third part of the image
--MIME boundary
```

EXAMPLE 1

Response of the Server Device According to the Invention

```
MIME-Version: 1.0
Content-Type: Multipart/Related;boundary=MIME_boundary;
    type="application/xop+xml";
    start="<mymessage.xml@example.org>" ;
    start-info="text/xml"
Content-Description: An XML document with my picture in it
--MIME_boundary
Content-Type: application/xop+xml;
        charset=UTF-8;
        type="text/xml"
Content-Transfer-Encoding: 8bit
Content-ID: mymessage.xml@example.org
<soap:Envelope
    xmlns:soap='http://www.w3.org/2003/05/soap-envelope'
    xmlns:xop='http://www.w3.org/2003/12/xop/include'
    xmlns:xmlmime='http://www.w3.org/2004/06/xmlmime'>
    <soap:Body>
        <m:data xmlns:m='http://example.org/stuff'>
            <m:photo xmlmime:content-type='image/jp2'>
                <xop:Include href='cid:http://example.org/myphoto.jp2'/>
            </m:photo>
        </m:data>
    </soap:Body>
```

-continued

```
</soap:Envelope>
--MIME boundary
Content-Type: image/jp2
Content-Transfer-Encoding: binary
Content-Length : 324842
Content-ID: http://example.org/myphoto.jp2
    // binary octets for the whole image
--MIME boundary
```

EXAMPLE 2

MTOM Message of the State of the Art

Following the response formation step E308, the response is sent to the client device during step E309 and this sending closes the processing of the server device. It should be noted that, if the server device detects that the format of the content requested is not scalable, it then proceeds with the writing of all the image data in a single "MIME part", as illustrated in example 2 above. This is carried out during step E307. This step is then followed by the complete writing of the message of example 2, step E308, and then its sending to the client device, step E309.

Figure 4:
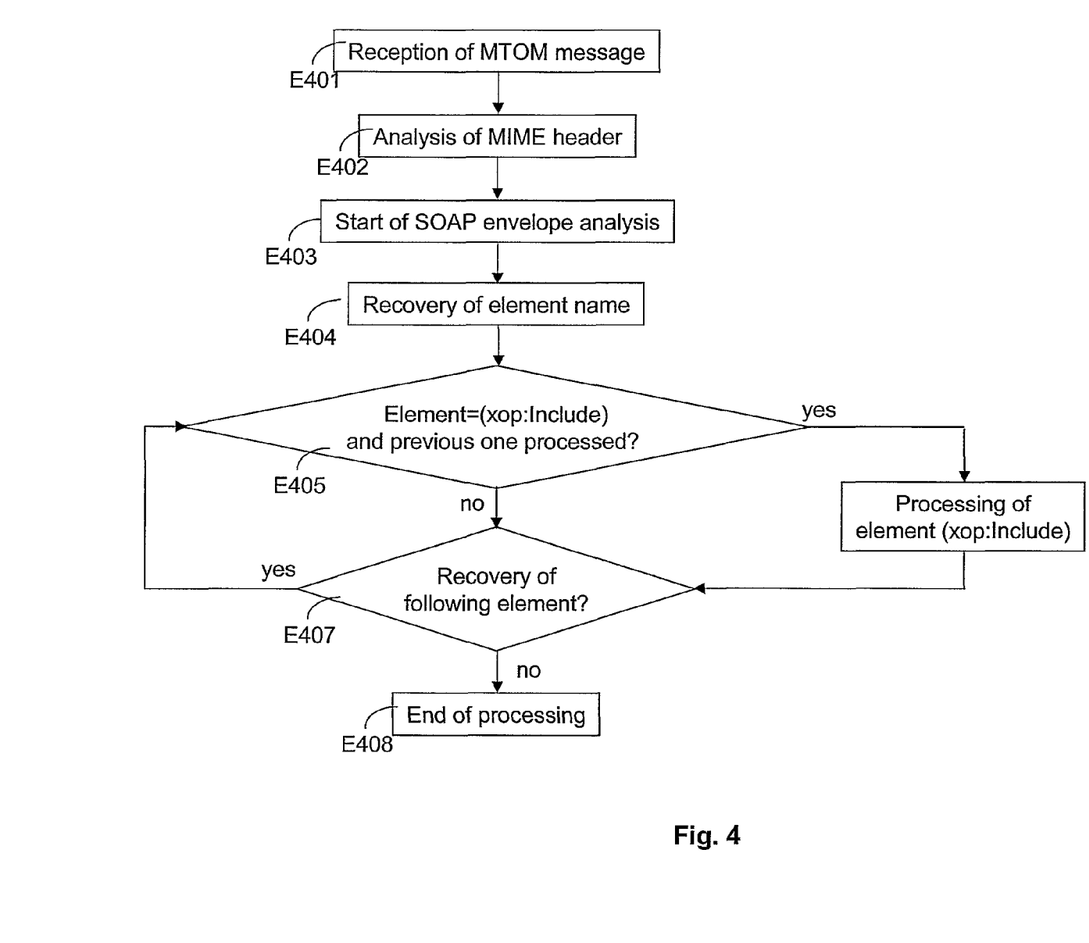
FIG. 4 is a flow diagram illustrating the steps of the method according the invention on the client device side.
Figure 5:
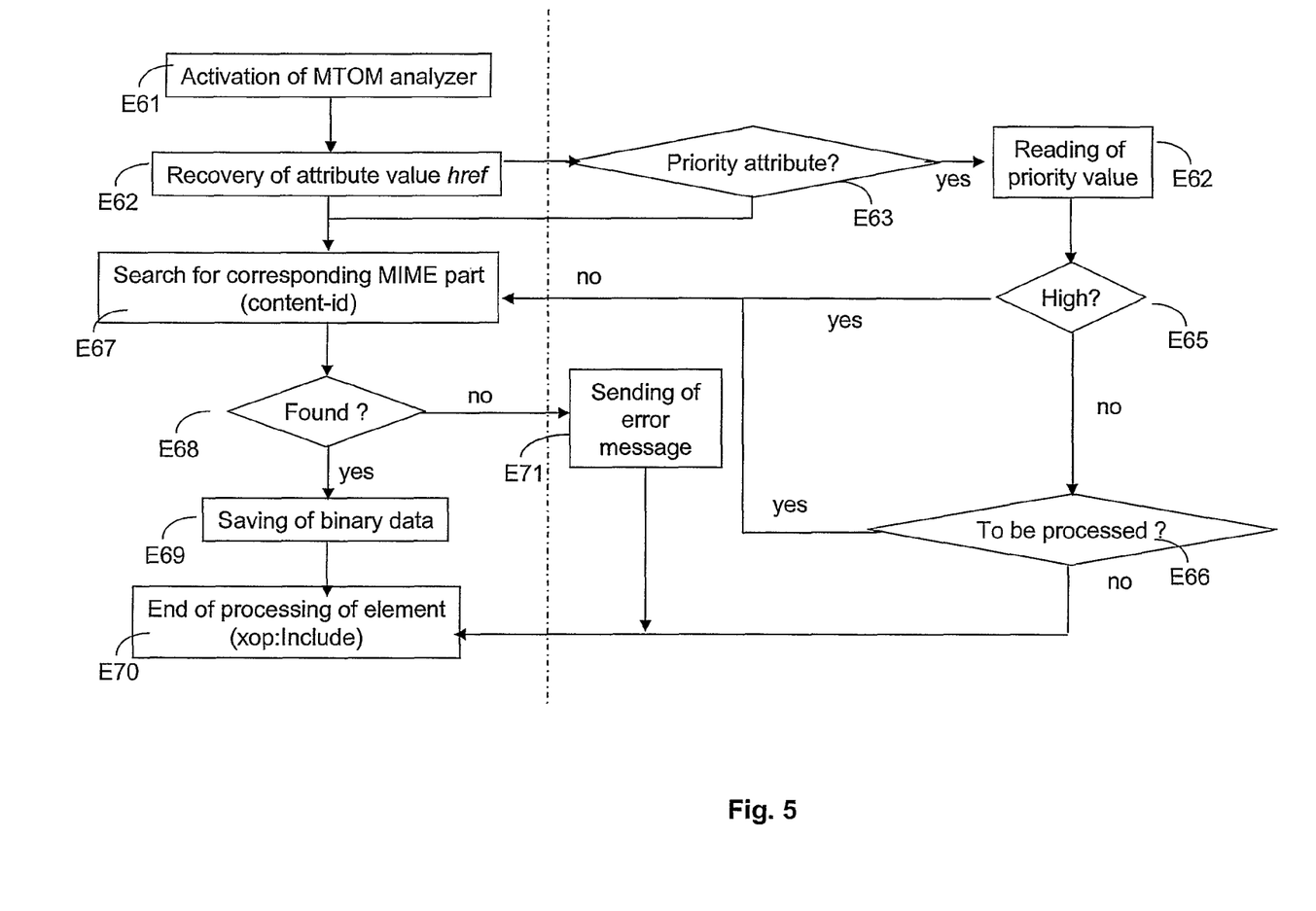
FIG. 5 is a flow diagram illustrating the processing of the XOP elements according to the invention.

With reference to FIGS. 4 and 5, the implementation of the invention on the client side is described. The first step consists of the reception of the response from the server device during step E401. This response is an MTOM message. The processing of this response commences at step E402 with the analysis (or parsing) of the header to the MIME format. This indicates, with reference to example 1, that the type of the content is xop+xml and also indicates the string of characters separating the various MIME parts (MIME Boundary). The header also indicates the root MIME part of the message, via the field "start". The analysis of the corresponding MIME part commences during step E403. It is the SOAP processor of the client device that takes charge of this operation by deserializing the envelope written in SOAP language and possibly processing the header of the SOAP message. During step E404, the processing of the body of the SOAP message is begun by recovering the name of the first element, according to the tag indicating the start of the body of the SOAP message (<soap :Body>). Then, during step E405, it is checked whether the element thus recovered corresponds to the tag <xop :Include>, and, if it is not a case of the first one of this type or the current parent element, it is checked whether the previous element has been processed. If this tag is not present or if the previous tag has been removed, the processing is continued with the step E407 of seeking the following element. During this same step, it is tested whether this following element exists in order either to loop back to step E405, or terminate the processing to step E408. If the test step E405 indicates that the current element is indeed an <xop :Include>, the processing then continues, according to step E406, detailed below with reference FIG. 5. At the end of this processing, step E407 is passed to, where it is tested whether the element has been considered or not. If so, step E405 is passed to, otherwise the processing ends (E408) without considering the other elements.

In FIG. 4, part of the invention appears which consists of considering that several elements (xop :Include) can follow each other (looping back from step E407 to step E405), as well as the test step E405 making it possible if necessary to shorten the processing of the remaining MIME parts.

With reference to FIG. 5, step E406 of FIG. 4 is detailed. The steps in the left hand column correspond to the conventional processing when the invention is not used, whereas the intermediate steps on the right correspond to the invention.

The first step of the processing, step E61, consists of activating the MTOM analyzer. This step consists of recovering, from the XML analyzer, the value of the current namespace and the associated prefix (typically xop) and the name of the current element (Include). It also consists of recovering a Boolean value from the application (JPEG2000 decoder/display according to a preferred mode) indicating whether the parts or sub-parts with a weak or low priority rank are to be considered or not (in accordance with the following description of step E66). If these values are coherent (as defined in the XOP specification), then the following step E62 consists of checking whether the attribute href is indeed present and recovering its value. As from this step, the modifications made by the invention occur: step E63 consists of checking whether an attribute "priority" is present or not. If it is not present (the conventional case), it is then considered that the part to the MIME format referenced by the attribute href is of high priority and must be processed. This MIME part is then recovered during step E67. For this purpose, a MIME analyzer seeks amongst the parts to the MIME format of the message whether one of them corresponds to the "content-ID" in terms of value of the attribute href. If this part is found during the test step E68, then the associated value data are extracted from the message and made available to the application (JPEG2000 decoder/display according to a preferred mode) in a shared buffer during step E69. The processing of the element (xop :Include) ends then at step E70. If the MIME part is not found, corresponding to the negative test of step E68, the MTOM analyzer must then generate an error (step E71) which must go back to the application, which decides or not on continuing the processing via step E407 of FIG. 4.

If during step E63 an attribute "priority" is detected, then the MTOM analyzer recovers its value at step E64. The following step, step E65, consists of testing whether the value of the attribute "priority" is high or not. If its value is a character string, this step can consist of a comparison with "high" and "low". If the priority is expressed in the form of an integer value, this step can consist of a thresholding based on a predefined value. For example, if N possible priority levels are defined, if n the current priority level is greater than or equal to N/2, then the priority rank is considered to be high.

In the case where the priority rank is high, the MIME part must be processed. For this purpose, it is recovered during step E67 and then follows steps E68, E69 and E70. In the case of a priority considered to be not high, step E66 enables the application to decide on the processing or not of the associated MIME part. This step can consist of a test on, for example, a quantity of binary data previously received or on a processing time criterion for the client device (for example for video or audio). The implementation consists, in this step E66, of processing the MIME parts with the weak or low priority rank also only if the quantity of data already received is compatible with the characteristics of the client machine. For this purpose, during this step E66, the MTOM analyzer considers the event received from the application during the activation E61 in order to determine whether the processing ends without considering the data (passage to step E70) or by processing them (passage to step E67). If the data are not considered, a tag is kept in the MTOM analyzer and then passed to the SOAP processor during the search for the following element, step E407 in FIG. 4. This marker is used subsequently in the test of step E405, as described before.

The present invention has the advantage of providing a means of organizing the binary data in a hierarchical fashion via a protocol independent of the transportation and the operating systems of the client and server devices.

A simplified implementation of the invention could be carried out by considering only the first xop:Include and ignoring the following ones.

The invention claimed is:

1. A method of transferring digital data between a client device and a server device on a communication network, said method being implemented within said server device, said method comprising the following steps performed in the following successive order:
   i) receiving a request in mark-up format for the delivery of a digital object, the request coming from the client device,
   ii) obtaining in the communication network an encoded representation of the digital object requested,
   iii) checking whether the encoded representation of the digital object corresponds to a progressive data compression format,
   iv) in response to checking, dividing the encoded representation of the digital object into a plurality of sub-parts, each of the sub-parts being in the encoded form of the encoded representation, and, once the division is made, assigning to each of the encoded sub-parts a priority rank defined according to at least one predetermined criterion, the priority rank indicating to the client device whether a processing of the encoded sub-part is mandatory or optional,
   v) forming a response in mark-up format for transmitting the encoded sub-parts in binary format as attachments, the step of forming the response comprising adding (a) mark-up elements indicative of the presence of attachments and (b) corresponding mark-up attributes representative of the priority ranks associated with encoded sub-parts of the digital object in binary format comprised in the corresponding attachments, and
   vi) sending the formed response in mark-up format to the client device from the server device.

2. A method according to claim 1, in which the parameters of the request coming from the client device are defined by XML mark-up structures exchanged between the client device and the server device by the SOAP transport protocol.

3. A method according to claim 2, in which the sending of the response to the client device is carried out by the sending of a message comprising XML mark-up structures and binary data, the corresponding binary data being formatted in the XOP mark-up format.

4. A method according to claim 2, in which the sending of the response to the client device is carried out by the sending of a message comprising XML mark-up structures and binary data, the corresponding binary data being formatted in the XOP mark-up format.

5. A method according to claim 1, in which the sending of the response to the client device is carried out by the sending of a message comprising XML mark-up structures and binary data, the corresponding binary data being formatted in the XOP mark-up format.

6. A method according to claim 5, wherein the sending of the message is carried out by the SOAP transport protocol, the message being serialized according to the MTOM protocol.

7. A method according to claim 6, wherein the binary data of each encoded sub-part of the object are included in a MIME part.

8. A method according to claim 1, in which the priority rank is defined according to at least one item of information relating to the digital object or to the transfer thereof and belonging to the group formed by the transfer rate, the resolution of the object, and the quality of the object.

9. A method according to claim 1, in which the priority rank is expressed in the form of a chain of digital or alphanumeric characters or Boolean operators.

10. A method according to claim 1, wherein, in the case of a high priority rank, the addition in the form of an attribute in the response from the server device is optional.

11. A method according to claim 1, wherein the request comprises the URI of the object requested.

12. A method according to claim 1, wherein the progressive data compression format is JPEG2000.

13. A non-transitory information medium read by a computer system, the information medium containing instructions of a computer program for implementing a method according to claim 1.

14. A partially or totally removable non-transitory information medium read by a computer system, the information medium containing instructions on a computer program for implementing a method according to claim 1, when the program is loaded into and executed by a computer system.

15. A computer program stored on a non-transitory information medium, said program containing instructions for implementing a method according to claim 1, when said program is loaded into and executed by a computer system.

16. A method of transferring digital data between a client device and a server device over a communication network, said method comprising the following steps performed in the following successive order:
   1) in response to a request to supply a digital object addressed to the server device, dividing, within the server device, an encoded representation of the digital object into sub-parts, each of the sub-parts being in the encoded form of the encoded representation;
   2) forming, within the server device, a response to the request to supply a digital object, the step of forming the response comprising adding (a) mark-up elements indicative of a presence of attachments and (b) corresponding mark-up attributes representative of priority ranks associated with encoded sub-parts of the digital object, each priority rank indicating to the client device whether a processing of the encoded sub-part is mandatory or optional;
   3) receiving, within the client device, the response, coming from the server device, in a mark-up format, the response including, as attachments, the sub-parts of the encoded representation of the digital object, each of the sub-parts being in the encoded form of the encoded representation, and comprising the mark-up elements indicative of the presence of the attachments and the corresponding mark-up attributes representative of the priority ranks associated with encoded sub-parts of the encoded representation of the digital object comprised in the corresponding attachments, each priority rank indicating to the client device whether the processing of the encoded sub-part is mandatory or optional;
   4) processing, within the client device, encoded sub-parts to which a priority rank indicating that the processing is mandatory is allocated;
   5) for each encoded sub-part to which a priority rank indicating that the processing is optional is allocated, verifying, within the client device, a processing capacity condition; and
   6) in case of positive verification, processing, within the client device, the binary data of that encoded sub-part of the object, wherein in the case of negative verification, that encoded sub-part is not taken into account.

17. A method according to claim 16, wherein the processing capacity condition is a function of a quantity of binary data previously received by the client device or the processing time of the client device.

18. A method according to claim 17, further comprising a step of checking whether a priority attribute is present or not in each encoded sub-part and, if a priority attribute is detected, recovering the value of the corresponding priority rank.

19. A client device for the transfer of digital data from a server device on a communication network, said client device comprising:

reception means for receiving a response, coming from the server device in response to a request to deliver a digital object addressed to the server device, in mark-up format, the response including, as attachments, sub-parts of an encoded representation of the digital object, each of the sub-parts being in the encoded form of the encoded representation and comprising (a) mark-up elements indicative of a presence of the attachments and (b) corresponding mark-up attributes representative of priority ranks associated with encoded sub-parts of the encoded representation of the digital object comprised in the corresponding attachments, each priority rank indicating to the client device whether a processing of the encoded sub-part is mandatory or optional; and processing means to (a) process sub-parts to which a priority rank indicating that the processing is mandatory is allocated and (b) for each encoded sub-part to which a priority rank indicating that the processing is optional is allocated, to verify a processing capacity condition, to process the binary data of that encoded sub-part in case of positive verification, and to not take into account that encoded sub-part in case of negative verification, the encoded representation of the digital object being divided, within the server device, into the sub-parts, each of the sub-parts being in the encoded form of the encoded representation, and the response to the request to deliver the digital object being formed, within the server device, by adding the mark-up elements indicative of the presence of the attachments and the corresponding mark-up attributes representative of the priority ranks associated with the encoded sub-parts.

20. A device for transferring digital data between a client device and a server device on a communication network, comprising:

(a) a server device to implement a method of transferring data, the method comprising the following steps: i) coming from the client device, receiving a request, in markup format, for the delivery of a digital object, ii) obtaining in the communication network an encoded representation of the digital object requested, iii) checking whether the encoded representation of the digital object corresponds to a progressive data compression format, iv) in response to checking, dividing the encoded representation of the digital object into a plurality of sub-parts, each of the sub-parts being in the encoded form of the encoded representation, and, once the division is made, assigning a priority rank defined according to at least one predetermined criterion to each of the encoded sub-parts, the priority rank indicating to the client device whether a processing of the encoded sub-part is mandatory or optional, v) forming a response in mark-up format for transmitting the sub-parts in binary format as attachments, the step of forming the response comprising adding (a) mark-up elements indicative of the presence of attachments and (b) corresponding mark-up attributes representative of the priority ranks associated with encoded sub-parts of the digital object in binary format comprised in the corresponding attachments, and vi) sending the formed response in mark-up format to the client device from the server device; and (b) a client device according to claim 19.

21. A method according to claim 16, further comprising a step of checking whether a priority attribute is present or not in each encoded sub-part and, if a priority attribute is detected, recovering the value of the corresponding priority rank.

22. A device for transferring digital data between a client device and a server device on a communication network, comprising:

(a) a server device to implement a method of transferring data, the method comprising the following steps: i) coming from the client device, receiving a request, in mark-up format, for the delivery of a digital object, ii) obtaining in the communication network an encoded representation of the digital object requested, iii) checking whether the encoded representation of the digital object corresponds to a progressive data compression format, iv) in response to checking, dividing the encoded representation of the digital object into a plurality of sub-parts, each of the sub-parts being in the encoded form of the encoded representation, and, once the division is made, assigning a priority rank defined according to at least one predetermined criterion to each of the encoded sub-parts, the priority rank indicating to the client device whether a processing of the encoded sub-part is mandatory or optional, v) forming a response in mark-up format for transmitting the encoded sub-parts in binary format as attachments, the step of forming the response comprising adding (a) mark-up elements indicative of the presence of attachments and (b) corresponding mark-up attributes representative of the priority ranks associated with encoded sub-parts of the digital object in binary format comprised in the corresponding attachments, and vi) sending the formed response in mark-up format to the client device from the server device; and (b) a client device according to claim 19, wherein the processing capacity condition is a function of a quantity of binary data previously received by the client device or the processing time of the client device.

23. A server device for the transfer of digital data to a client device on a communication network, said server device comprising:

reception means to receive a request in mark-up format to deliver a digital object, the request coming from the client device, means for obtaining in the communication network an encoded representation of the digital object requested, verification means for verifying whether the encoded representation of the digital object corresponds to a progressive data compression format, processing means for, in response to verifying, dividing the encoded representation of the digital object into a plurality of sub-parts, each of the sub-parts being in the encoded form of the encoded representation and, once the division is made, assigning a priority rank defined according to at least one predetermined criterion to each of the encoded sub-parts, the priority rank indicating to the client device whether a processing of the encoded sub-part is mandatory or optional, forming means for forming a response in mark-up format for transmitting the encoded sub-parts in binary format as attachments, the forming means comprising adding means for adding (a) mark-up elements indicative of the presence of attachments and (b) corresponding mark-up attributes representative of the priority ranks associated with encoded sub-parts of the digital object in binary format comprised in the corresponding attachments, and communication means for sending, to the client device from the server device, the formed response in mark-up format.

24. A client device according to claim 19, further comprising means for checking whether a priority attribute is present or not in each encoded sub-part and, if a priority attribute is detected, recovering the value of the corresponding priority rank.

25. A method of transferring digital data between a client device and a server device on a communication network, said method comprising the following steps:
   i) receiving, within said server device, a request in mark-up format for the delivery of a digital object, the request coming from the client device,
   ii) obtaining, within said server device, in the communication network an encoded representation of the digital object requested,
   iii) checking, within said server device, whether the encoded representation of the digital object corresponds to a progressive data compression format,
   iv) in response to checking, dividing, within said server device, the encoded representation of the digital object into a plurality of sub-parts, each of the sub-parts being in the encoded form of the encoded representation, and, once the division is made, assigning, within said server device, to each of the sub-parts a priority rank defined according to at least one predetermined criterion, the priority rank indicating to the client device whether a processing of the sub-part is mandatory or optional,
   v) forming, within said server device, a response in mark-up format for transmitting the sub-parts in binary format as attachments, the step of forming the response comprising adding (a) mark-up elements indicative of the presence of attachments and (b) corresponding mark-up attributes representative of the priority ranks associated with sub-parts of the digital object in binary format comprised in the corresponding attachments,
   vi) sending the formed response in mark-up format to the client device from the server device, and
   ii) testing, within the client device, at least one mark-up attribute representative of a priority rank and, as a function of the at least one mark-up attribute representative of the priority rank, processing the corresponding encoded sub-part or processing the corresponding encoded sub-part only when it is compatible with the characteristic of the client device.

26. A method according to claim 25, in which the parameters of the request coming from the client device are defined by XML mark-up structures exchanged between the client device and the server device by the SOAP transport protocol.

27. A method according to claim 25, in which the sending of the response to the client device is carried out by the sending of a message comprising XML mark-up structures and binary data, the corresponding binary data being formatted in the XOP mark-up format.

28. A method according to claim 27, wherein the sending of the message is carried out by the SOAP transport protocol, the message being serialized according to the MTOM protocol.

29. A method according to claim 28, wherein the binary data of each sub-part of the object are included in a MIME part.

30. A method according to claim 25, in which the priority rank is defined according to at least one item of information relating to the digital object or to the transfer thereof and belonging to the group formed by the transfer rate, the resolution of the object and the quality of the object.

31. A method according to claim 25, in which the priority rank is expressed in the form of a chain of digital or alphanumeric characters or Boolean operators.

32. A method according to claim 25, wherein, in the case of a high priority rank, the addition in the form of an attribute in the response from the server device is optional.

33. A method according to claim 25, wherein the request comprises the URI of the object requested.

34. A method according to claim 25, wherein the progressive data compression format is JPEG2000.

* * * * *